(12) United States Patent
Patel et al.

(10) Patent No.: US 10,996,405 B2
(45) Date of Patent: May 4, 2021

(54) FIBER COUPLER WITH AN OPTICAL WINDOW

(71) Applicant: Cisco Technology, Inc., San Jose, CA (US)

(72) Inventors: Vipulkumar Patel, Breinigsville, PA (US); Kumar Satya Harinadh Potluri, Milpitas, CA (US); Jock T. Bovington, La Mesa, CA (US); Ashley J. Maker, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 92 days.

(21) Appl. No.: 15/946,930

(22) Filed: Apr. 6, 2018

(65) Prior Publication Data

US 2019/0310431 A1 Oct. 10, 2019

(51) Int. Cl.
*G02B 6/38* (2006.01)
*G02B 6/28* (2006.01)
*G02B 6/26* (2006.01)
*H04B 10/25* (2013.01)
*B23K 1/005* (2006.01)
*B23K 103/00* (2006.01)

(52) U.S. Cl.
CPC .......... *G02B 6/3897* (2013.01); *G02B 6/262* (2013.01); *G02B 6/2804* (2013.01); *G02B 6/3809* (2013.01); *H04B 10/25* (2013.01); *B23K 1/0056* (2013.01); *B23K 2103/52* (2018.08); *B23K 2103/54* (2018.08)

(58) Field of Classification Search
CPC ..... G02B 6/3897; G02B 6/3648; G02B 6/325
See application file for complete search history.

(56) References Cited

U.S. PATENT DOCUMENTS 4,818,059 A * 4/1989 Kakii .................. G02B 6/3839
                                                            385/65
6,817,777 B1  11/2004 Grabbe
6,866,426 B1 * 3/2005 Steinberg ............... G02B 6/30
                                                            385/65

(Continued)

OTHER PUBLICATIONS

U.S. Appl. No. 15/841,005 titled "Passive Fiber Coupler With UV Windows,"filed Dec. 13, 2017.

(Continued)

*Primary Examiner* — Chris H Chu
(74) *Attorney, Agent, or Firm* — Patterson + Sheridan, LLP

(57) ABSTRACT

Embodiments herein describe a fiber array unit (FAU) configured to optically couple a photonic chip with a plurality of optical fibers. Epoxy can be used to bond the FAU to the photonic chip. However, curing the epoxy between the FAU and the photonic chip is difficult. As such, the FAU can include one or more optical windows etched into or completely through a non-transparent layer that overlap the epoxy disposed on the photonic chip. UV radiation can be emitted through the optical windows to cure the underlying epoxy. In one example, the windows can also be used for dispensing epoxy. In addition to the optical windows, the FAU can include alignment protrusions (e.g., frustums) which mate or interlock with respective alignment receivers in the photonic chip. Doing so may facilitate passive alignment of the optical fibers in the FAU to an optical interface in the photonic chip.

14 Claims, 12 Drawing Sheets

(56) References Cited

U.S. PATENT DOCUMENTS

| | | | |
|---|---|---|---|
| 7,724,990 B2 | 5/2010 | Ishida | |
| 8,873,908 B2 | 10/2014 | Hu et al. | |
| 2003/0012508 A1* | 1/2003 | Westmarland | G02B 6/30 385/49 |
| 2003/0103729 A1* | 6/2003 | Ishida | G02B 6/30 385/49 |
| 2005/0163431 A1* | 7/2005 | Moynihan | G02B 6/1221 385/60 |
| 2014/0270652 A1* | 9/2014 | Barwicz | G02B 6/3636 385/83 |
| 2014/0286605 A1* | 9/2014 | Lee | G02B 6/12 385/14 |
| 2015/0063747 A1* | 3/2015 | Chen | G02B 6/3636 385/14 |

OTHER PUBLICATIONS

U.S. Appl. No. 15/636,262 titled, "TSV Compatible Fiber Array Coupler for Silicon Photonics," filed Jun. 28, 2017.
Alexis Christian Weber, "Precision Passive Alignment of Wafers," Massachusetts Institute of Technology, Feb. 2002, 102 pages.

\* cited by examiner

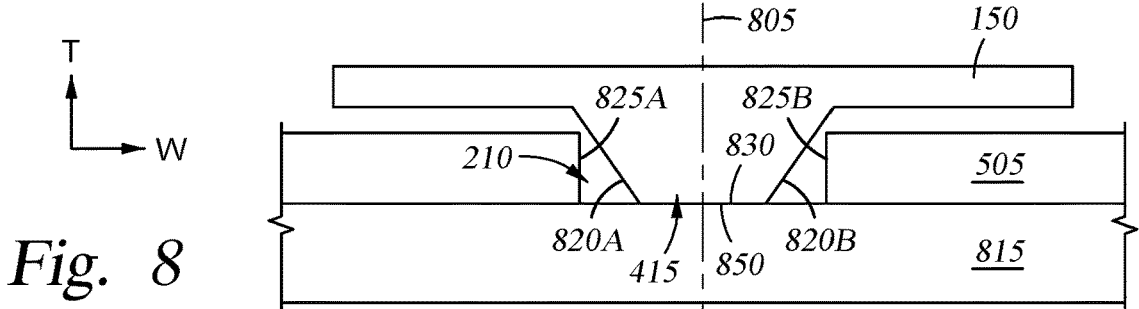
Fig. 8
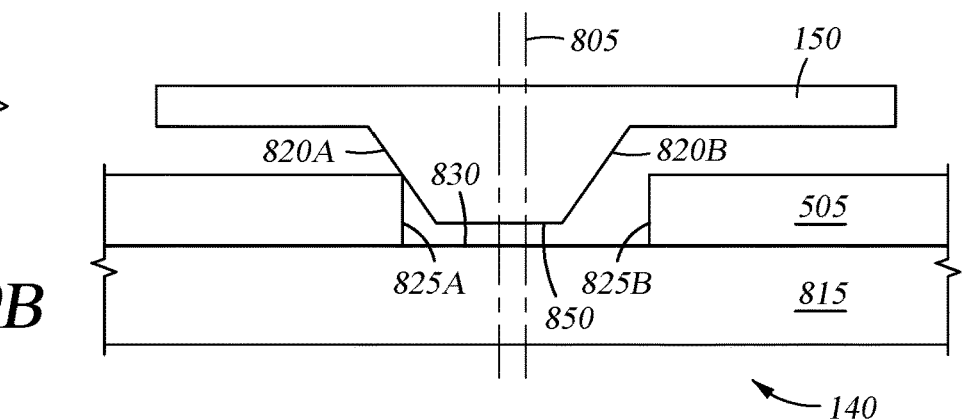
Fig. 9A
Fig. 9B
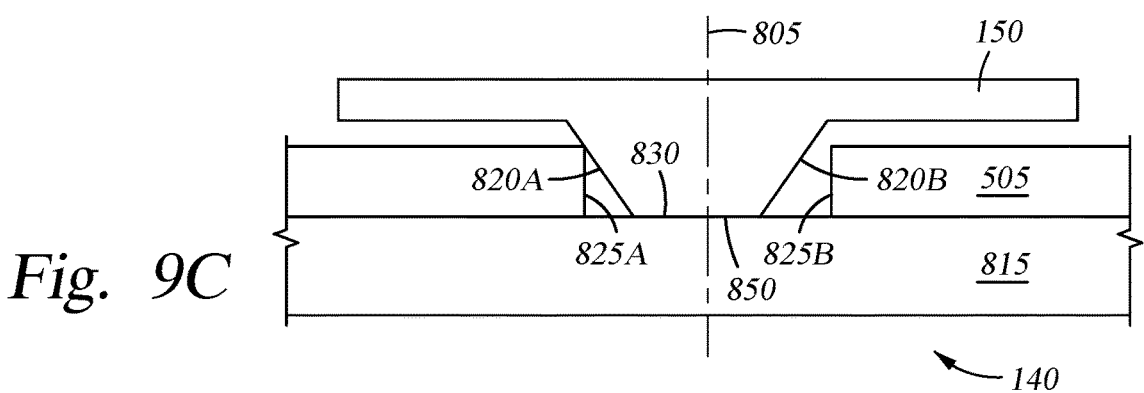
Fig. 9C

FIBER COUPLER WITH AN OPTICAL WINDOW

TECHNICAL FIELD

Embodiments presented in this disclosure generally relate to photonic devices, and more specifically, to edge coupling with photonic devices.

BACKGROUND

Generally, photonic chips have interfaces to permit optical signals to be received from an optical source (e.g., a laser or an optical fiber) or transmitted to an optical fiber. One such method is edge coupling where the optical fiber is coupled to the edge of the photonic chip. As the level of integration, speed of operation, and functionality increase, photonic chips are running out of peripheral bond pad space to allow wire bond based interconnection to the underlying substrate or printed circuit board (PCB). Thus, photonic chips with Through Silicon Vias (TSVs) are highly desirable as they allow for higher density of interconnects and reduce the resistance as well as inductance associated with the wirebond connections. It is also desirable to develop lower cost and more efficient approaches to attach optical components, such as fibers and lasers, to these TSV-compatible photonics chips.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 8 illustrates mating an alignment protrusion with an alignment receiver, according to one embodiment disclosed herein.

FIGS. 9A-9C illustrate mating a misaligned alignment protrusion with an alignment receiver, according to embodiments disclosed herein.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
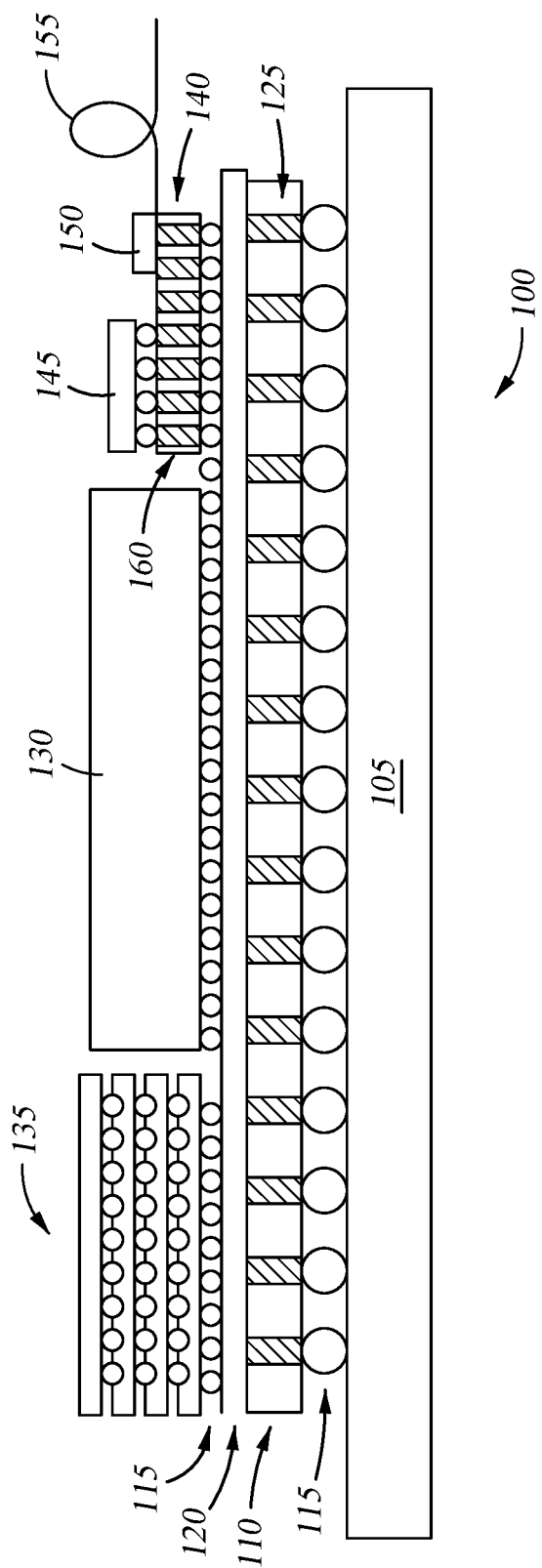
FIG. 1 illustrates an optical system, according to one embodiment disclosed herein.

One embodiment presented in this disclosure is an optical system that includes a photonic chip that includes a waveguide, an optical interface optically coupled to the waveguide, and an alignment receiver. The system also includes a fiber array unit (FAU) coupled with the photonic chip using cured adhesive. The FAU includes a substrate that has an optical window, a groove, and an alignment protrusion interlocked with the alignment receiver. The FAU also includes an optical fiber disposed in the groove and aligned to the optical interface in the photonic chip based on the interlocked relationship between the alignment protrusion and the alignment receiver and a lid where the optical fiber is disposed between the lid and the substrate. Moreover, the optical window is disposed over the cured adhesive.

Another embodiment described herein is an FAU that includes a substrate that has an optical window extending through a layer of non-transparent material, a plurality of grooves, and an alignment protrusion configured to mate with an alignment receiver. The FAU also includes a plurality of optical fibers disposed in the plurality of grooves where the alignment protrusion is configured to align the plurality of optical fibers with an external device when mated with the alignment receiver and a lid where the plurality of optical fibers is disposed between the lid and the substrate.

Another embodiment described herein is a method for aligning a photonic chip to an FAU where the photonic chip includes an alignment receiver and the FAU includes an optical window, a groove containing an optical fiber, and an alignment protrusion. The method includes moving at least one of the photonic chip and the FAU in a first direction so that a side of the alignment receiver contacts a sloped self-correcting alignment feature of the alignment protrusion, applying pressure in the first direction such that the contact between the side of the alignment receiver and the sloped self-correcting alignment feature results in relative motion between the FAU and the photonic chip in a second direction perpendicular to the first direction to interlock the alignment receiver with the alignment protrusion where interlocking the alignment receiver and the alignment protrusion passively aligns the optical fiber to an optical interface of the photonic chip, and curing adhesive to couple the FAU to the photonic chip using the optical window.

Example Embodiments

Generally, photonic chips have an optical interface to transmit optical signals to an optical fiber, or to receive optical signals from an optical source such as a laser or optical fiber. Some optical interfaces include edge couplers disposed at the sides of the photonic chip, which makes the photonic chips easier to manufacturer and improve optical coupling compared to other solutions. However, photonic chips with TSVs have several additional constraints on edge coupling. Wafers with TSVs are thinner (typically in the range of 50 um to 150 um). Hence, even though shallow trenches in a silicon substrate are possible, deep trenches (typically created by Deep Reactive Ion Etching (DRIE)) cannot be created to accommodate a lens or fiber placement for an edge coupler. In addition, TSVs constrain the overall optical packaging or assembly since photonic chips with TSVs are typically attached to a glass or silicon interposer or a ceramic or an organic substrate using conventional solder reflow or thermal compression bonding processes. As such, conventional edge coupling techniques cannot be used with a photonic chip that has TSVs. However, the embodiments described herein can also be applied to other coupling approaches, such as evanescent coupling and vertical coupling from the die surface.

In order for optical components (e.g., photonic chip, optical fiber, laser, etc.) to function properly, the optical components are aligned with each other. Optical alignment is the process of aligning optical elements with one another to maximize the accuracy and performance of transmitted signals. Active alignment involves a person (or aligning machine) viewing and aligning the different components based on feedback when transmitting optical signals between the components, which increases the cost of manufacturing photonics chips. Passive alignment (also referred to as mechanical alignment) relies on strict manufacturing tolerance of components and optical based initial placement to ensure the components are aligned properly when the components are placed at their respective position without aligning the components based on feedback—i.e., without transmitting optical signals between the components.

Embodiments herein describe a fiber array unit (FAU) configured to align a plurality of optical fibers to a photonic chip. The FAU has a plurality of grooves for receiving the plurality of optical fibers. In one embodiment, the FAU includes at least one alignment feature that correspond to an alignment feature in the photonic chip to achieve passive alignment. A die bonder may be used to place the FAU on the photonic chip using the alignment features for precise alignment. Instead of using alignment features that may align using a sliding motion, for example, by sliding the FAU along a side of the photonic chip, the embodiments herein use alignment features which permit a die bonder to align the FAU to the photonic chip by pressing a top of the photonic chip into contact with a bottom surface of the FAU. In one embodiment, the alignment features in the FAU include one or more frustums while the alignment features in the photonic chip include corresponding square or rectangular trenches.

Epoxy (or other adhesive) can be used to bond the FAU to the photonic chip when the optical fibers attached to the FAU are aligned with an optical interface in the photonic chip. To facilitate curing the epoxy between the FAU and the photonic chip, embodiment of the FAU includes one or more optical windows that overlap epoxy dispensed on the photonic chip which permits radiation (e.g., UV light or microwave radiation) to pass therethrough. As such, during curing, UV light can pass through the optical windows in the FAU to cure the epoxy disposed between the FAU and the photonic chip.

FIG. 1 illustrates an optical system 100, according to one embodiment herein. As shown, the optical system 100 has a substrate 105 and an interposer layer 110 connected via solder 115. The interposer layer 110 is a layer with through electrical connections and routing layers on Silicon, Glass, Ceramic or organic material. The interposer layer 110 is coupled to a redistribution layer (RDL) 120. Coupled to the RDL 120 are an application specific integrated circuit (ASIC) 130, a high bandwidth memory (HBM) 135, and a photonic chip 140 which includes a semiconductor material. The RDL 120 allows electrical connections to be made between electrical components coupled to it. Stated differently, the RDL 120 allows components (e.g., the ASIC 130, the HBM 135, the photonic chip 140, etc.) to communicate electrically by minimizing external electrical connections. As shown, the interposer layer 110 has a plurality of Through Silicon Vias (TSVs) 125, which couple the RDL 120 to the semiconductor substrate 105. While the interposer layer 110 is shown with TSVs, the interposer layer 110 may be made of glass in which case the interposer layer 110 would be a through via or a through oxide via. In one embodiment, the TSVs 125 provide power to the RDL 120 which in turn routes the power to the ASIC 130, the HBM 135, and the photonic chip 140.

As shown, the photonic chip 140 is coupled to a driver 145 and a FAU 150. The driver 145 sends/receives signals to/from an optical fiber 155 via the FAU 150 and the photonic chip 140. In another embodiment, the driver 145 is a transimpedance amplifier that amplifies the electrical signals generated by an optical detector (not shown) in the photonic chip 140 in response to photonic signals received from the optical fiber 155 mounted on the FAU 150. As shown, the photonic chip 140 has a plurality of TSVs 160. In one embodiment, the photonic chip 140 provides power from the Printed Circuit Board (PCB) or organic/ceramic substrate through the interposer layer 110 to the driver 145 via one of the TSVs 160.

In one embodiment, the ASIC 130 and the driver 145 communicate via the TSVs 160 in the photonic chip 140, as well as the interposer layer 110 and the RDL 120. In one embodiment, the ASIC 130 includes logic for providing data to and from the photonic chip 140 from outside the system 100. For example, the ASIC 130 can send signals to the driver 145 such that the driver 145 sends a signal to a modulator (not shown) in the photonic chip 140, and the modulator encodes the data from the driver 145 onto an optical signal. In one embodiment, at high speed operation, the driver 145 is placed directly onto the photonic chip 140 to provide electrical connections that are as short as possible. In one embodiment, the optical detector in the photonic chip 140 outputs voltages based on a received optical signal to the driver 145. The driver 145 in turn provides data to the ASIC 130 based on the received signal. In one embodiment, the HBM 135 stores settings for the ASIC 130 which dictate how the ASIC 130 communicates between the driver 145 and external devices and systems. In another embodiment, the HBM 135 stores settings for how the photonic chip 140 receives and transmits optical signals.

In one embodiment, the photonic chip 140 is a photonics transceiver that receives and transmits optical signals. For example, an optical signal may be transmitted along the optical fiber 155 where the photonic chip 140 receives the optical signal. As another example, the photonic chip 140 transmits an optical signal to the optical fiber 155. In this manner, the photonic chip 140 can communicate using the optical fiber 155 to an external system. In one embodiment, the photonic chip 140 is an optical modulator that is controlled by electrical data signals received from the driver 145. In another embodiment, the photonic chip 140 is an optical detector that transmits electrical signals to the ASIC 130 via the driver 145. Specifically, the TSVs 160 of the photonic chip 140 and traces on the PCB or organic/ceramic substrate have an electrical signal that corresponds to an optical signal detected by the photonic chip 140. In this manner, the optical system 100 may send and/or receive optical signals.

Figure 2:
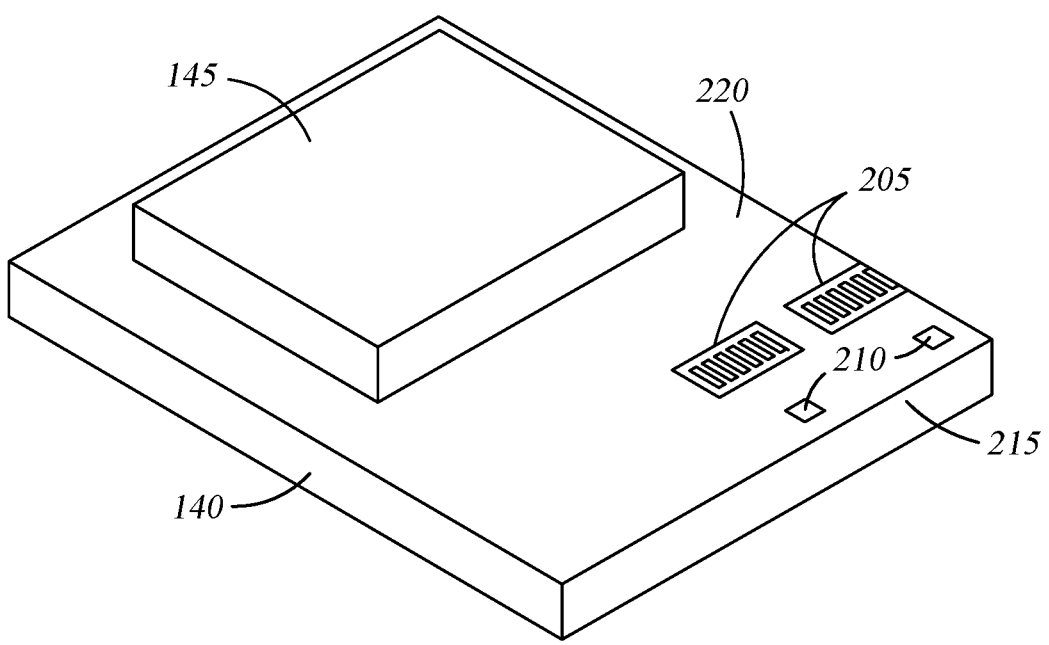
FIG. 2 illustrates alignment features for coupling a photonic chip to a fiber array unit, according to one embodiment disclosed herein.

FIG. 2 illustrates alignment features for coupling the photonic chip 140 to a FAU, according to one embodiment disclosed herein. As shown, the features are formed in a top surface 220 of the photonic chip 140 on which the driver 145 is mounted. In this embodiment, the features include epoxy wells 205, alignment receivers 210, and an optical interface 215. The epoxy wells 205 may include etched portions of the top surface 220 that have been recessed for receiving epoxy (or other adhesive that can be cured using UV radiation) for coupling the photonic chip 140 to the FAU (not shown). In this example, the two epoxy wells 205 include raised features (e.g., islands). The raised features may have the same height as the other portions of the top surface 220 of the photonic chip 140. However, the area of the epoxy wells 205 surrounding the raised features is recessed relative to the top surface 220 to form a containment area for the epoxy.

In one embodiment, the photonic chip 140 also includes epoxy wells disposed near the optical interface 215. These epoxy wells may, or may not, have raised features like the ones shown in the epoxy wells 205. In one embodiment, all the epoxy wells 205 on the photonic chip 140 have the same depth and are formed during the same etching process.

The alignment receivers 210 are designed to receive corresponding alignment features in the FAU. The arrangement of the receivers 210 in the photonic chip 140 may enable passive alignment in at least one alignment direction. For example, by aligning the alignment features in the FAU to the alignment receivers 210, the optical fibers mounted to the FAU are aligned with the optical interface 215 in at least one of the X, Y, or Z directions such that optical signals can be transferred between the photonic chip 140 and the optical fibers via the optical interface 215. The alignment receivers 210 may have the same depth as the epoxy wells 205 or a different depth. In one embodiment, the alignment receivers 210 are rectangular or square trenches formed in the top surface 220.

In one embodiment, the photonic chip 140 includes one or more TSVs, and thus, its thickness may be limited as explained above. However, the embodiments herein are not limited to edge coupling an FAU to a photonic chip 140 with TSVs but can be used in a photonic chip that does not includes TSVs.

Figure 3:
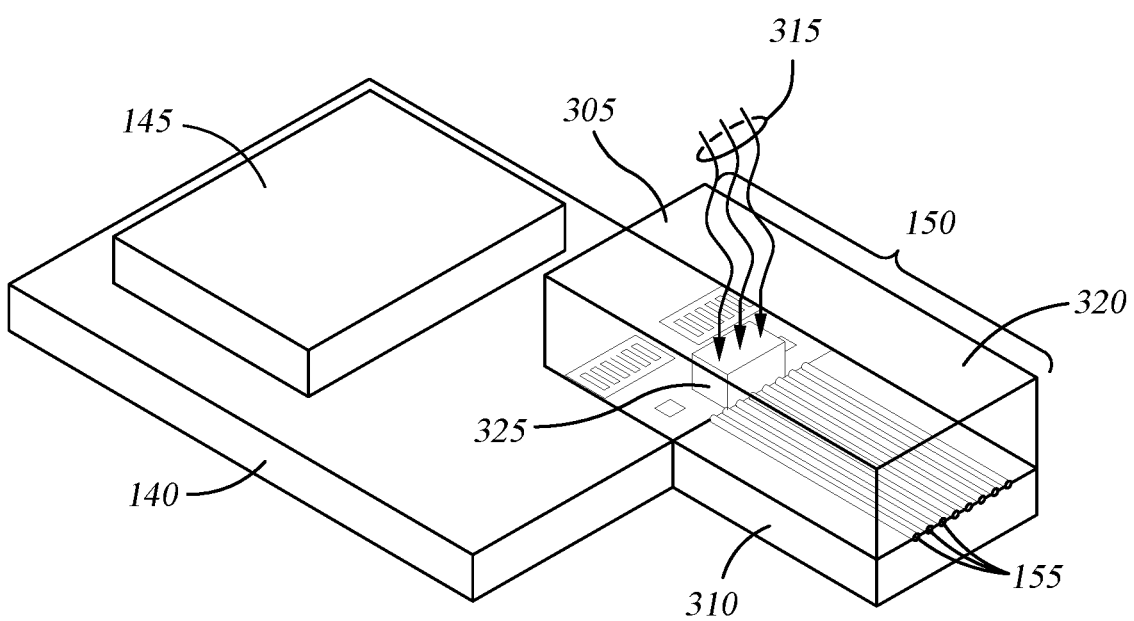
FIG. 3 illustrates coupling a fiber array unit to the photonic chip, according to one embodiment disclosed herein.

FIG. 3 illustrates coupling the FAU 150 to the photonic chip 140, according to one embodiment disclosed herein. As shown, the FAU 150 includes the optical fibers 155 which are mounted between a substrate 305 and a lid 310. In FIG. 3, the substrate 305 is shown as being transparent so that the underlying details of the FAU 150 and the photonic chip 140 can be seen. In some embodiments, the substrate 305 may be made from a transparent material (such as glass) or non-transparent material (such as crystalline silicon). As used herein, "transparent" when used in context of the substrate 305 refers to a material that permits electromagnetic radiation that can cure epoxy to pass therethrough. Put differently, when formed from a transparent material, the substrate 305 can be formed from any material which is transmissive (or transparent) to radiation used to cure the epoxy disposed in the epoxy wells 205. In one embodiment, the substrate 305 is transparent to ultra violet (UV) light 315 which is used to cure the epoxy. Suitable materials for the transparent substrate 305 could be glass or silicon dioxide.

However, in FIG. 3 it is assumed that at least a portion of the substrate 305 is made from a non-transparent or opaque material. That is, the UV light 315 may unable to pass through the substrate 305 to reach the epoxy wells or the optical interface 215 where epoxy may be disposed. To aid in curing the epoxy, the substrate 305 includes an optical window 325 through the substrate 305. The optical window 325 can be an etched feature in the substrate 305 or be formed in the substrate 305 when the substrate is fabricated (e.g., if the substrate 305 is a molded part). The advantage of a non-transparent substrate 305 is that it can be formed from more cost effective materials and less complicated processes relative to a transparent substrate. For example, instead of using a transparent substrate, the substrate 305 can be formed entirely from silicon (as shown in FIGS. 14A-B and 16A-B) which is less expensive and may use less complicated fabrication processes. Although at least partially formed from a non-transparent material, adding the windows 325 in the substrate 305 still permits the UV light 315 (or other types of radiation such as microwave radiation) to reach and cure the epoxy disposed between the FAU 150 and the photonic chip 140.

In one embodiment, the optical fibers 155 are aligned to respective waveguide adapters (not shown) at the optical interface 215. That is, the waveguide adapters can be exposed at the optical interface 215 (or recessed slightly away from the optical interface 215—e.g., a few microns) so that light can be transferred between the optical fibers 155 and waveguides in the photonic chip 140. In one embodiment, the FAU 150 is passively aligned to the photonic chip 140 using the alignment receivers 210 and corresponding alignment features in the FAU 150 (which are not shown in FIG. 3). That is, using a die bonder (or other alignment means), the FAU 150 can be lowered in the direction perpendicular to the top surface 220 such that alignment features in the FAU 150 mate with the alignment receivers 210 in the photonic chip 140 with sufficient precisions so that active alignment is not needed.

Figure 4:
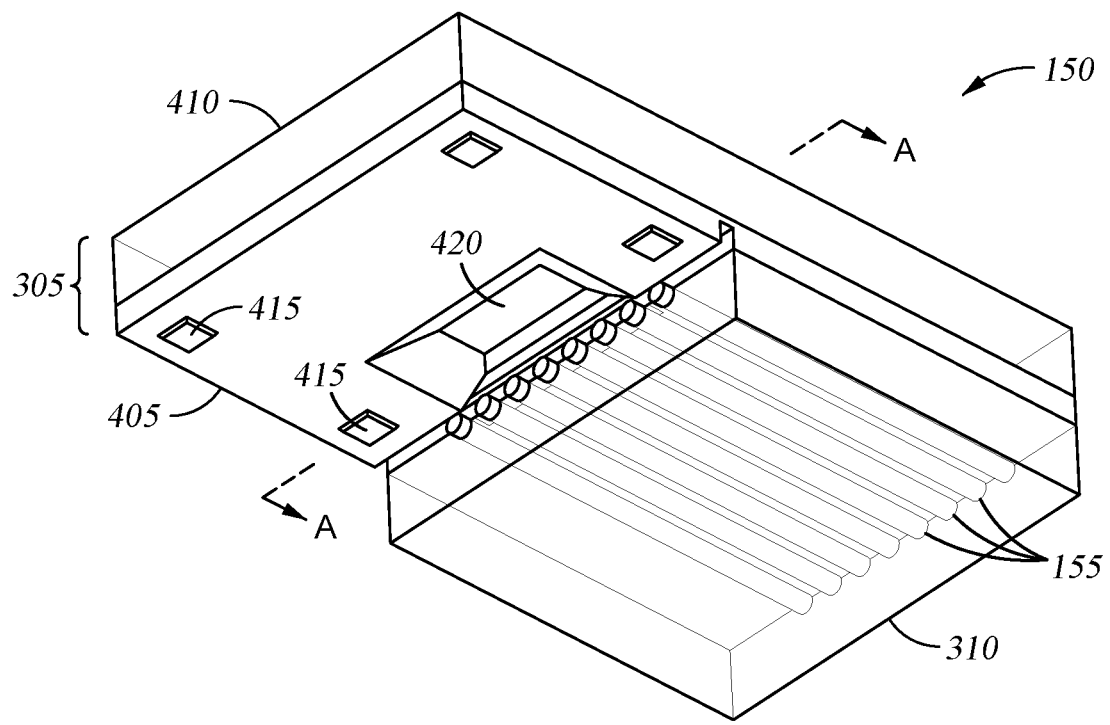
FIG. 4 illustrates a fiber array unit with an optical window, according to one embodiment disclosed herein

FIG. 4 illustrates a FAU 150 with an optical window 420, according to one embodiment disclosed herein. Specifically, FIG. 4 illustrates a view of a bottom surface of the substrate 305 in the FAU 150 which is in a facing relationship with the photonic chip. In this embodiment, the substrate 305 includes both transparent and opaque materials. A transparent layer 410 is disposed above a silicon layer 405. The transparent layer 410 can include silicon dioxide that forms a SOI structure with the silicon layer 405. In another embodiment, the transparent layer 410 is glass or other transparent material which permits UV light for curing epoxy to pass therethrough.

The silicon layer 405 is processed to include alignment protrusions 415 which each align to a corresponding one of the alignment receivers 210 illustrated in FIG. 2. In this example, the alignment protrusions 415 are frustums that extend or protrude from the silicon layer 405 such that the protrusions 415 can mate with the alignment receivers 210 in the photonic chip which passively align the optical fibers 155 to the optical interface of the photonic chip in at least one alignment direction.

The silicon layer 405 also includes an etched optical window 420 which permits optical radiation to pass through the silicon layer 405 to reach epoxy disposed between the substrate 305 and the photonic chip. That is, while the transparent layer 410 permits radiation to pass therethrough, the silicon layer 405 does not. Thus, adding the window 420 to the silicon layer 405 permits light emitting from the top surface of the substrate 305 to reach the bottom surface of the substrate 305 and the underlying epoxy.

Figure 5:
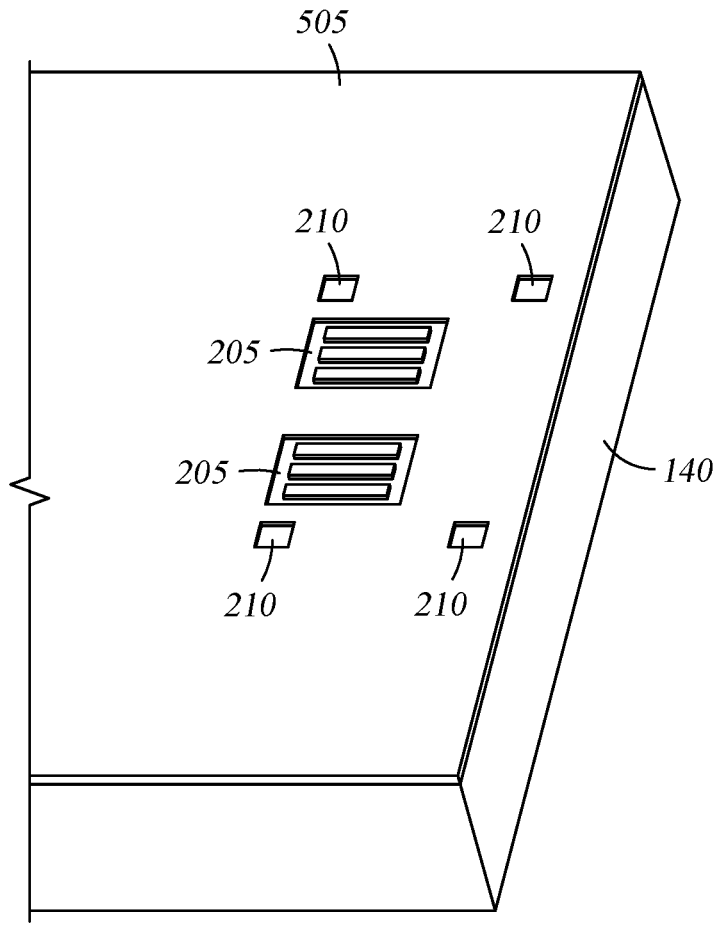
FIG. 5 illustrates a photonic chip with epoxy wells and alignment receivers, according to embodiments disclosed herein.

FIG. 5 illustrates a photonic chip 140 with epoxy wells 205 and alignment receivers 210, according to embodiments disclosed herein. In this example, the epoxy wells 205 and the alignment receivers 210 are formed in an interlayer dielectric (ILD) 505. The ILD 505 can include optical couplers which serve as interfaces between waveguides in the photonic chip 140 and the optical fibers 155 in the FAU 150. In one embodiment, the thickness or height of the ILD 505 is less than 15 microns.

Four alignment receivers 210 are formed in the ILD 505 which mate with the four alignment protrusions 415 in the FAU 150. That is, the FAU 150 and the photonic chip 140 can be moved in a vertical direction that is perpendicular to the bottom surface of the silicon layer 405 and the top surface of the ILD 505 such that the protrusions 415 interlock with the receivers 210. Thus, the machine or apparatus that aligns the components does not need to move in a horizontal motion (e.g., in a direction parallel to the bottom surface of the silicon layer 405 and the top surface of the ILD 505) to align the optical fibers 155 with optical couplers in the ILD 505, although there may be some horizontal motion as the protrusions 415 interlock with the receivers 210. Put differently, using the alignment features illustrated in FIGS. 4 and 5, the bonding machine or apparatus may not need to slide the silicon layer 405 in a direction parallel to the top surface of the ILD 505 in order to align the optical fibers 155 to the photonic chip 140.

Figure 6:
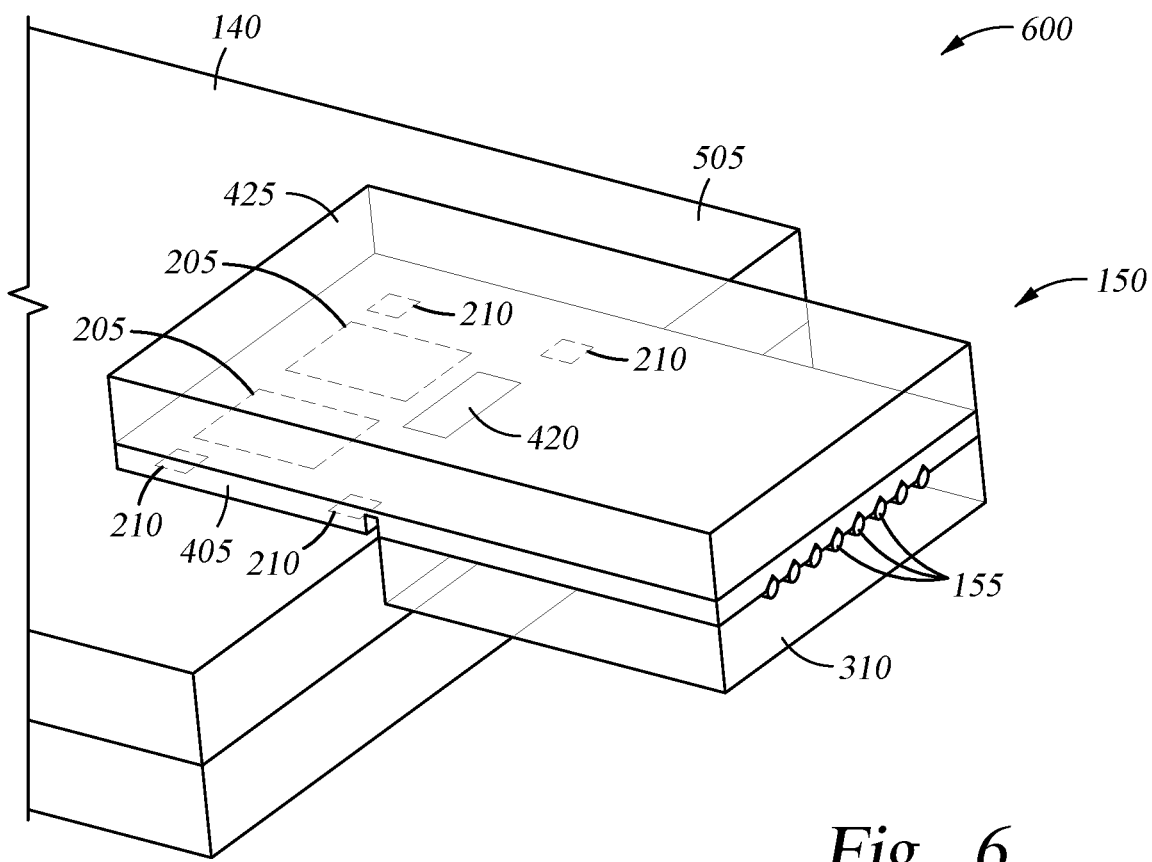
FIG. 6 illustrates coupling a fiber array unit to a photonic chip, according to one embodiment disclosed herein.

FIG. 6 illustrates coupling the FAU 150 shown in FIG. 4 to the photonic chip 140 shown in FIG. 5 to form an optical system 600, according to one embodiment disclosed herein. The silicon layer 405 is shown as being transparent so that the details of the underlying structures can be seen. As shown, the protrusions in the silicon layer 405 interlock or mate with the alignment receivers 210 which align the optical fibers 155 to optical couplers in the ILD 505. Further, the optical window 420 permits radiation emitted through the top surface of the transparent layer 425 to pass through the silicon layer 405 to reach the surface of the ILD 505 on which epoxy is disposed. In this embodiment, the window 420 may be arranged such that the radiation can reach index matching (or non-index matching) epoxy disposed between the ends of the optical fibers 155 facing the ILD 505. That is, to improve optical coupling between the optical fibers 155 and the optical couplers in the optical interface of ILD 505, epoxy is disposed in a space between the fibers 155 and the optical interface. The window 420 may be formed in the silicon layer 405 to ensure UV light reaches this space in order to cure the epoxy therein. Further, the window 420 may serve as an epoxy reservoir for holding excess epoxy, which may prevent misalignment between the FAU 150 and the photonic chip 140.

Figure 7:
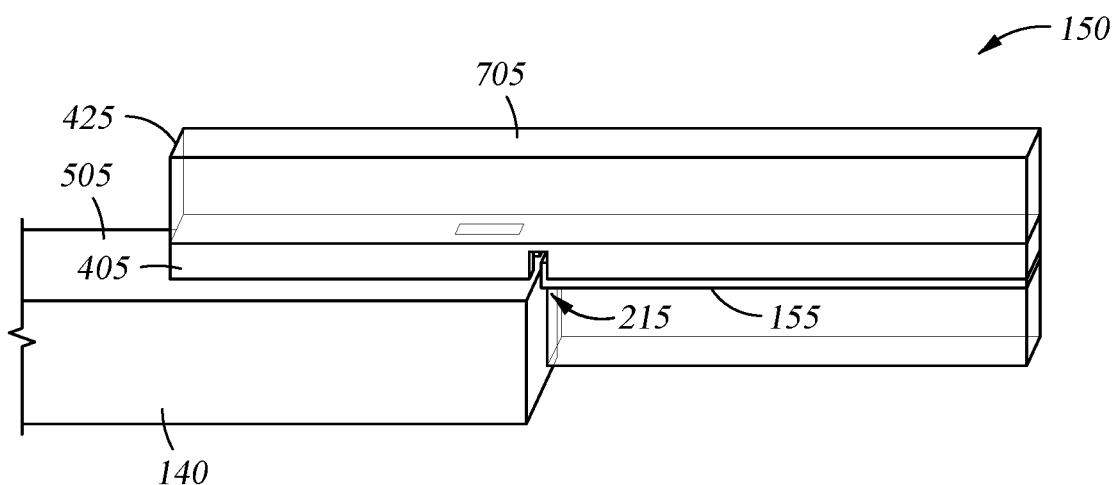
FIG. 7 illustrates coupling a fiber array unit to a photonic chip, according to embodiments disclosed herein.

FIG. 7 illustrates coupling the FAU 150 to the photonic chip 140, according to embodiments disclosed herein. Specifically, FIG. 7 is a side view of the optical system 600 illustrated in FIG. 6. Here, the tips or ends of the optical fibers 155 terminate at the optical interface 215 in the ILD 505. There can be an air gap (less than 10 microns) between the tips of the optical fibers 155 and the optical interface 215. The optical window (not shown in FIG. 7) in the silicon layer 405 permits radiation passing through a top surface 705 of the transparent layer 425 to pass through the silicon layer 405 and reach the optical interface 215.

Although FIGS. 4, 6, and 7 discuss a single optical window in the silicon layer 405 for curing epoxy at the optical interface 215, the embodiments herein are not limited to such. For example, instead of disposing an optical window over the interface 215, the optical window may instead be disposed over the epoxy wells 205. In another embodiment, the silicon layer 405 may include multiple etched windows where one optical window 420 is disposed over the optical interface 215 as shown, and another one or more windows are disposed over the epoxy wells 205.

FIG. 8 illustrates mating an alignment protrusion 415 with an alignment receiver 210, according to one embodiment disclosed herein. Specifically, FIG. 8 illustrates a cross section of the alignment protrusion 415 and the alignment receiver 210. In one embodiment, these features may form a frustum and a rectangular trench, respectively.

FIG. 8 illustrates a desired target location 805 where a middle of the alignment protrusion 415 aligns with a middle of the alignment slot 210. That is, for optimal alignment, the middle of the alignment protrusion 415 contacts the middle of a bottom surface 830 of the alignment receiver 210. In this example, the alignment receiver includes a trench or cutout in the ILD 505 on the top of the photonic chip 140. The ILD 505 may be formed on a substrate 815 of the photonic chip 140 which may be a semiconductor substrate such as crystalline silicon.

In this example, a bottom surface 850 of the alignment protrusion 415 in the FAU 150 contacts the bottom surface 830 of the alignment receiver 210. Moreover, as discussed in more detail below, the alignment protrusion 415 includes self-correcting alignment features 820 (e.g., the slanted sides of the protrusion 415) which contact sides 825 of the alignment receiver 210 for correcting the alignment of the FAU 150 and the photonic chip 140 when the middles of the protrusion 415 and the receiver 210 are not aligned.

FIGS. 9A-9C illustrate mating a misaligned alignment protrusion 415 with an alignment receiver 210, according to embodiments disclosed herein. FIG. 9A illustrates a scenario where the middle of the alignment protrusion 415 is offset 905 from the desired target location 805. The difference between the offset 905 and the target location 805 is illustrated as a misalignment 910. Stated differently, the misalignment 910 is the distance between respective middles of the alignment protrusion 415 and the alignment receiver 210.

The misalignment 910 can occur because of tolerances corresponding to the bonding machine or apparatus (e.g., a die bonder) used to place the FAU 150 on the photonic chip 140. For example, the die bonder may guarantee that the middle of the alignment protrusion 415 is within +/−10 microns from the middle of the alignment receiver 210 (e.g., the desired target location 805). FIG. 9A illustrates a worst case scenario where the misalignment 910 is the maximum tolerance of the bonding machine.

To compensate for the tolerance or accuracy of the bonding machine, the alignment protrusion 415 is designed such that regardless of the misalignment 910, the self-correcting alignment feature 820 contacts a side 825 of the alignment receiver 210. That is, the width (W) of the alignment protrusion 415 can be controlled such that the flat, bottom surface 850 of the protrusion 415 falls within the receiver 210, and as a result, at least one of the self-correcting alignment features 820 contacts one of the sides 825.

The accuracy of the alignment in FIG. 8 where the bottom surface 850 of the protrusion 415 contacts the bottom surface 830 of the receiver 210 may depend on the amount of control of the flatness of the bottom surface 850 on the protrusion 415 and the tolerance on the etch depth of the receiver 210 (which can be around +/−0.5 microns for many dielectrics). Moreover, the slope of the self-correcting alignment features can be tightly controlled using an orientation dependent etch such as a KOH etch and the like.

In FIG. 9A, when the die bonder moves the FAU in the vertical direction illustrated by the arrow 912, the bottom surface 850 is between the sides 825A and 825B. Thus, even at maximum misalignment 910, the bottom surface 830 is within the receiver 210.

As the FAU 150 continues to move in the direction shown by the arrow 912, the self-correcting alignment feature 820A contacts the side 825A which is illustrated in FIG. 9B. The die bonder continues to apply downward pressure but the resulting contact between the feature 820A and the side 825A creates a horizontal motion as shown by the arrow 915 which moves the middle of the alignment protrusion 415 closer to the middle of the alignment receiver 210. That is, in one embodiment, the die bonder does not apply the horizontal motion directly (e.g., the die bonder may apply pressure in the vertical direction) for the FAU 150 to move horizontally relative to the photonic chip 140 to correct for the misalignment 910. The vertical pressure applied by the die bonder is converted into the horizontal motion illustrated by the arrow 915 to align the piece parts.

FIG. 9C illustrates when the die bonder has moved the parts until the bottom surface 850 of the FAU 150 contacts the bottom surface 830 of the alignment receiver 210. The middles of the alignment protrusion 415 and the alignment receivers 210 may both be aligned at the target location 805, although there may be some remaining misalignment due to the tolerances of the fabrication steps using to form the protrusion 415 and the receivers 210. However, the tolerances for processing the protrusion 415 and the receivers 210 may be much smaller or tighter than the tolerances for the die bonder—e.g., within +/−300 nanometers. For example, the alignment protrusions 415 may be formed from silicon or a molded material with very tight fabrication tolerances. Similarly, the techniques for etching the alignment receiver 210 in the ILD 505 can have much tighter tolerances than the die bonder.

Figure 10:
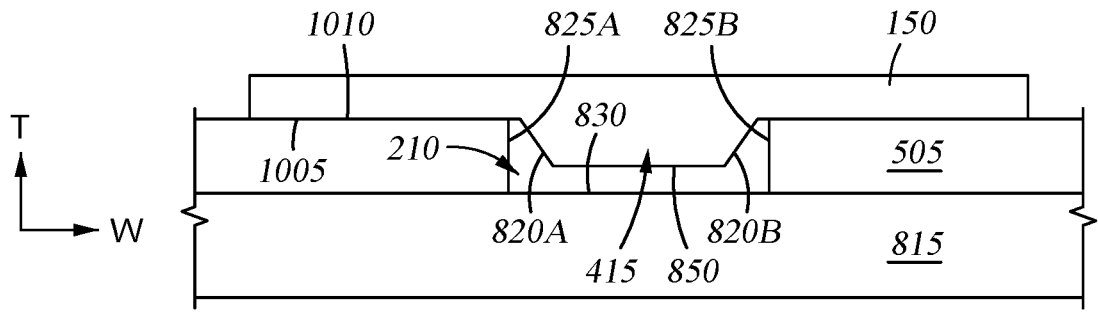
FIG. 10 illustrates mating an alignment protrusion with an alignment receiver, according to embodiments disclosed herein.

FIG. 10 illustrates mating the alignment protrusion 415 with the alignment receiver 210, according to embodiments disclosed herein. Unlike in FIG. 8 where the bottom surface of the protrusion 415 contacts the bottom surface of the receiver 210, in this example, there remains a gap between the bottom surface 850 of the protrusion 415 and the bottom surface 830 of the receiver 210. Instead, the thickness of the protrusion is controlled such that a bottom surface 1005 of the FAU 150 at a base of the frustum formed by the alignment protrusion 415 contacts a top surface 1010 of the ILD 505 (or a top surface of the photonic chip 140).

Alignment is achieved by the self-correcting alignment features 820 contacting the sides 825 of the receiver 210. That is, the width (W) of the protrusion can be controlled such that the bottom surface 850 fits between the sides 825 regardless of the misalignment. This aligns the components in the X and Z directions (i.e., the horizontal axis and the axis into and out of the page). Y direction alignment (i.e., the vertical axis) is achieved by the bottom surface 1005 contacting the top surface 1010. The accuracy of this alignment technique depends on the accuracy of the ILD 505 etch depth which can be around +/−1 micron.

In one embodiment, given the tolerances associated with the fabrication steps forming the protrusion 415 and the receiver 210, at least one of the self-correcting alignment features 820 may contact one of the sides 825 when aligned, while at least one other of the self-correcting alignment features 820 does not. However, in other embodiments, multiple alignment features 820 may contact respective sides 825 when aligned.

Figure 11:
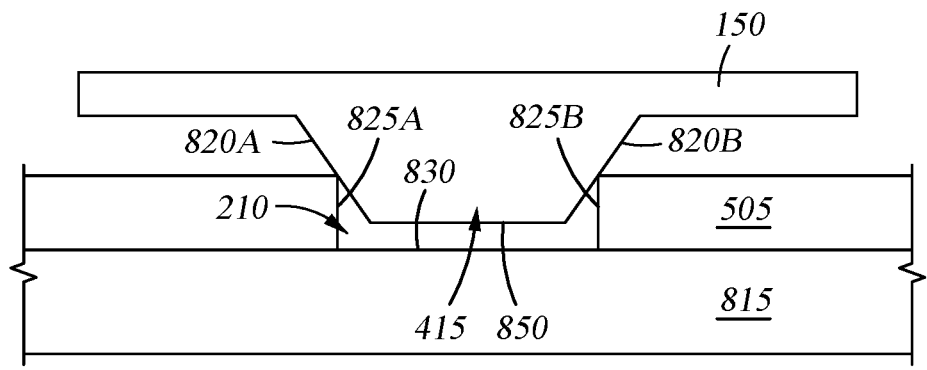
FIG. 11 illustrates mating an alignment protrusion with an alignment receiver, according to one embodiment disclosed herein.

FIG. 11 illustrates mating the alignment protrusion 415 with the alignment receiver 210, according to one embodiment disclosed herein. In this example, the width of the alignment protrusion 415 is again controlled such that the bottom surface 850 fits inside the sides 825 regardless of the misalignment. However, instead of alignment being achieved when a flat surface of the FAU 150 contacts a flat surface of the photonic chip 140, here the FAU 150 is aligned to the photonic chip 140 when the self-correcting alignment feature 820 on one side of the protrusion 415 and the self-correcting alignment feature 820 on the opposite side of the protrusion 415 both contact respective sides 825 of the alignment receiver 210. Although FIG. 11 illustrates the self-correcting alignment feature 820A contacting the side 825A and the self-correcting alignment feature 820B contacting the side 825B, three or four self-correcting alignment features 820 in the protrusion 415 may contact respective sides 825 of the receiver 210. Contacting two oppositely disposed self-correcting alignment features 820 to two sides 825 of the receiver provide alignment in the X and Y direction. Moreover, when a third self-correcting alignment feature 820 (which is disposed between the two oppositely disposed alignment features) contacts a side 825 of the receiver 210, this can provide alignment in the Z direction.

Figure 12:
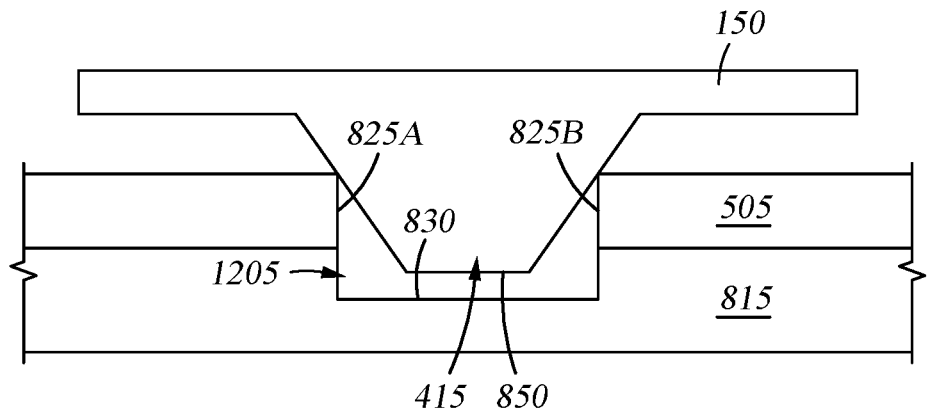
FIG. 12 illustrates mating an alignment protrusion with an alignment receiver, according to one embodiment disclosed herein.

FIG. 12 illustrates mating the alignment protrusion 415 with the alignment receiver 210, according to one embodiment disclosed herein. FIG. 12 relies on a similar alignment principle in FIG. 11 where at least two opposing self-correcting alignment features 820 contact respective sides 825 of a trench—e.g., a deep alignment receiver 1205. However, instead of forming the receiver solely within the ILD 505, in FIG. 12, the deep alignment receiver 1205 extends into the substrate 815. In one embodiment, the deep alignment receiver 1205 may have a depth greater than 15 microns. Further, the depth of the alignment receiver 1205 may permit the protrusion 415 to have a pyramidal shape rather than a frustum shape as shown in FIG. 12. That is, the self-correcting alignment features 820 may intersect at a point rather than forming a flat bottom surface facing the bottom surface of the deep alignment receiver 1205.

One advantage of using the alignment technique illustrated in FIGS. 11 and 12 is the spacing between the bottom surface of the FAU 150 and the top surface of the ILD 505 can be filled with epoxy for bonding the two components together. However, relying on contact between the self-correcting alignment features 820 and the sides 825 of the receiver 210, 1205 can cause stress which may increase the likelihood of chipping the sides 825.

Figure 13A:
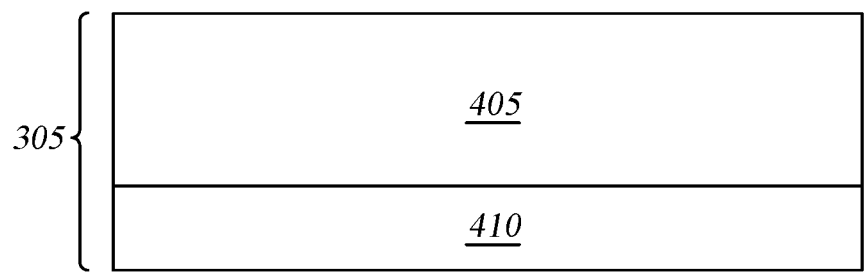
FIGS. 13A-13C illustrates forming alignment protrusions and an optical window for the fiber array unit in FIG. 4, according to one embodiment disclosed herein.
Figure 13B:
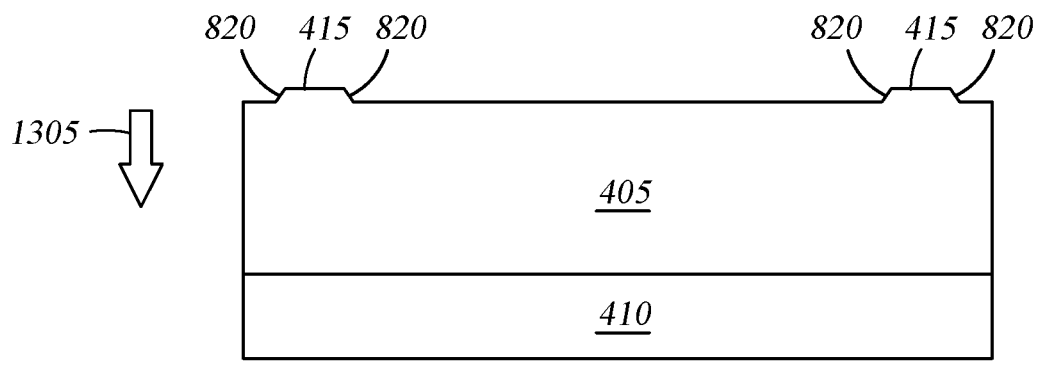
Figure 13C:
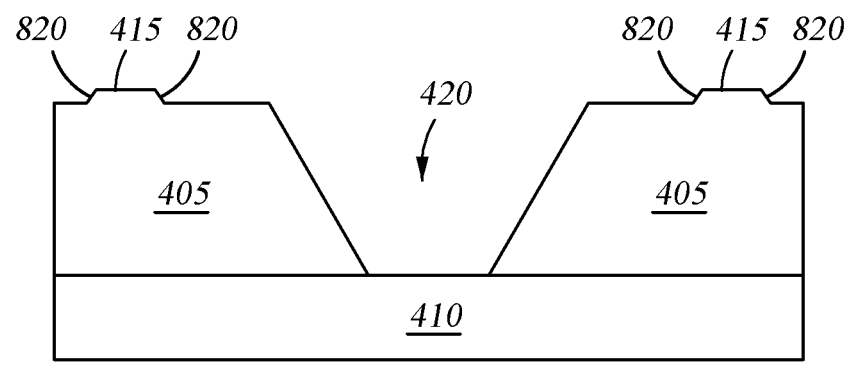

FIGS. 13A-13C illustrates forming alignment protrusions and an optical window for the FAU 150 in FIG. 4, according to one embodiment disclosed herein. In one embodiment, the process illustrated in FIGS. 13A-13C is performed before the optical fibers and lid are attached to the substrate 305. Further, the cross section of the substrate 305 in FIGS. 13A-13C corresponds to the dotted line A-A illustrated in FIG. 4.

FIG. 13A illustrates a substrate 305 that includes the transparent layer 410 and the silicon layer 405. In one embodiment, the transparent layer 410 is silicon dioxide and the substrate 305 is part of a SOI structure. For example, the transparent layer 410 and the silicon layer 405 can be combined to form the substrate 305 using a wafer bonding process and grinding to achieve a desired thickness of the silicon layer 405. However, the embodiments are not limited these materials or fabrication processes.

FIG. 13B illustrates etching the silicon layer 405 in the direction shown by arrow 1305 to form two alignment protrusions 415. To achieve the frustum shape with the sloped self-correcting alignment features 820, an orientation dependent etch (e.g., a KOH etch) can be used. The height or thickness of the protrusions may depend on which alignment technique is used—e.g., one of the alignment techniques illustrated in FIG. 8 or 10-12. In one embodiment, the thickness of the protrusion may be around 25 microns.

FIG. 13C illustrates etching the silicon layer 405 to form the window 420. As such, radiation emitted up through the transparent layer 410 can pass through the silicon layer 405 via the window 420. Thus, epoxy disposed between the silicon layer 405 and the photonic chip (not shown) can be cured using UV radiation passing through the window 420.

In one embodiment, the window 420 is formed using an orientation dependent etch such as KOH. Using a mask, a sufficient area of the silicon layer can be etched to form a desired size of the window 420 at an interface between the silicon layer 405 and the transparent layer 410. That is, the size of the area in the silicon layer 405 exposed to the etching agent is dependent on the angle of the etch and the desired size of the window 420 at the transparent layer 410. The etching agent may selectively etch the silicon layer 405 but not etch the material in the transparent layer 410.

Further, although not shown in FIG. 13C, the same etching step used to form the window 420 can also be used to form V-grooves for the optical fibers in the silicon layer 405, although these features can be formed in separate etching steps. For example, instead of using an orientation dependent etch, sandblasting or a deep reactive-ion etch (DRIE) can be used to form the window 420 or windows (which would have vertical rather than sloped sides), while a KOH etch is used to form the V-grooves. Moreover, after forming the window 420 and the V-grooves, a dicing step may be performed for forming an alignment stop at the end of the V-grooves for aligning the optical fibers in V-grooves.

Figure 14A:
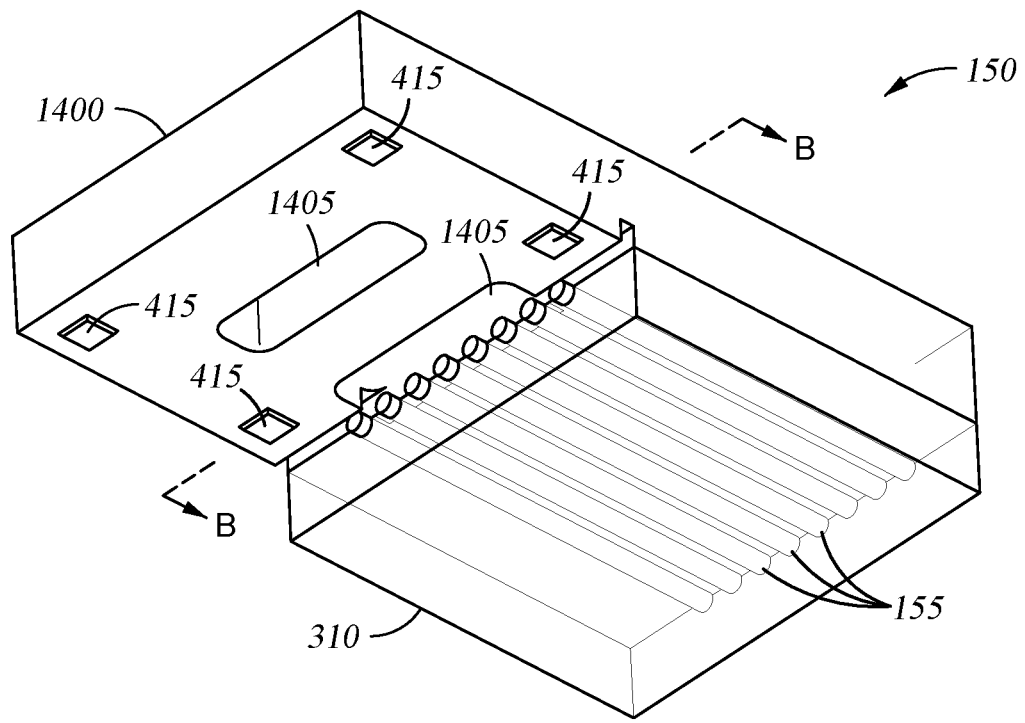
FIGS. 14A and 14B illustrate a fiber array unit with a silicon substrate, according to one embodiment disclosed herein.
Figure 14B:
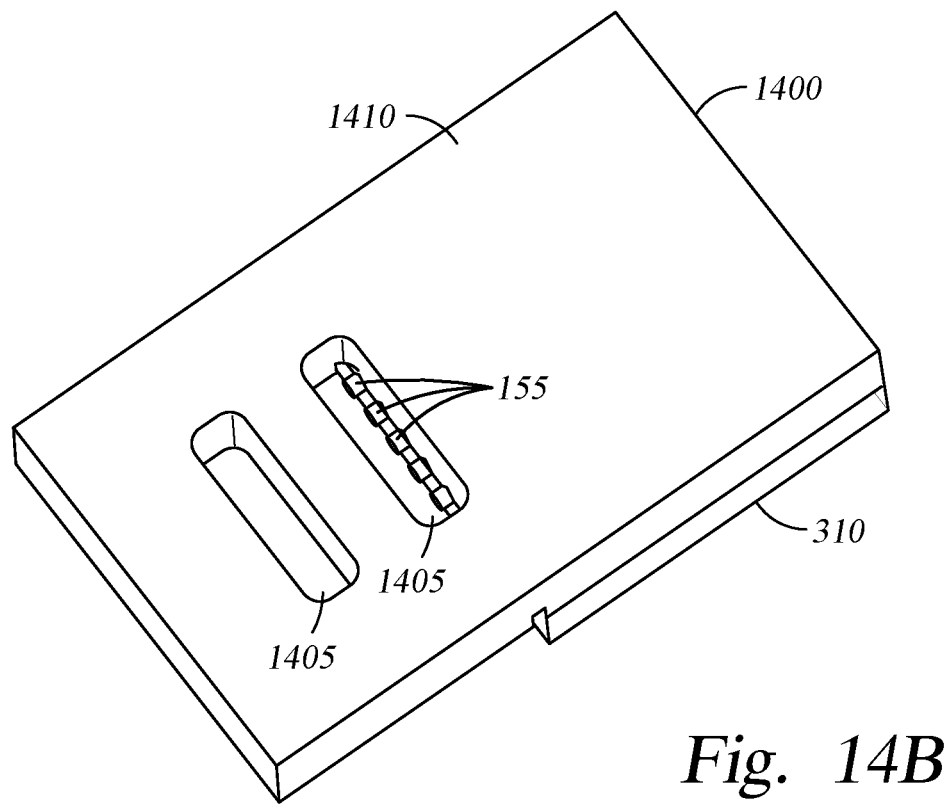

FIGS. 14A and 14B illustrate a FAU 150 with a silicon substrate 1400, according to one embodiment disclosed herein. That is, in contrast to the FAU 150 in FIG. 4, here, the FAU 150 includes a semiconductor substrate (e.g., the silicon substrate 1400) that does not include a transparent layer. For example, the silicon substrate 1400 may be less expensive and less complicated to form than the substrate 305 in FIG. 4. In one embodiment, the silicon substrate 1400 has a thickness greater than 500 microns. In another embodiment, the silicon substrate 1400 has a thickness greater than 1000 microns.

The silicon substrate 1400 includes the alignment protrusions 415 and optical windows 1405. For example, one optical window 1405 may be disposed over or near the optical interface in the photonic chip, while another optical window 1405 is disposed over one or more of the epoxy wells in the photonic chip. Although two optical windows 1405 are shown, the silicon substrate 1400 can include any number of windows 1405, e.g., one, three, four, or more windows.

FIG. 14B illustrates a top surface 1410 of the silicon substrate 1400. The top surface 1410 is opposite a surface on the silicon substrate 1400 that includes the alignment protrusions 415 and faces the photonic chip. When curing epoxy disposed between the FAU 150 and the photonic chip, radiation is emitted through the top surface 1410 and through the silicon substrate 1400 via the windows 1405. As shown, because the termination ends or tips of the optical fibers 155 can be seen through the rightmost optical window 1405, this window 1405 may be used to cure index matching or non-index matching epoxy that is disposed between the termination ends of the optical fibers 155 and the optical interface in the photonic chip. The leftmost optical window 1405 may be disposed over one or more epoxy wells.

Figure 15A:
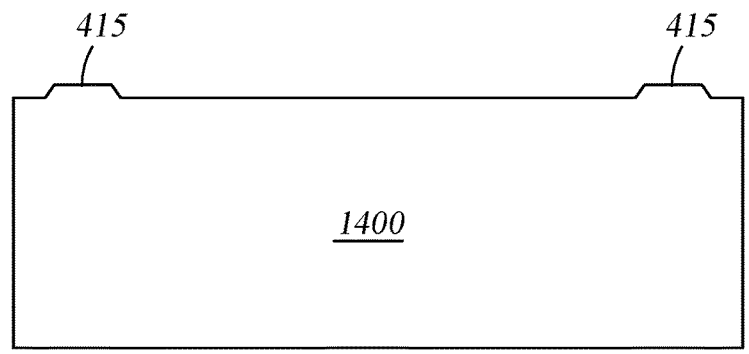
FIGS. 15A-15C illustrate forming alignment protrusions and an optical window in the fiber array unit in FIGS. 14A and 14B, according to one embodiment disclosed herein.
Figure 15B:
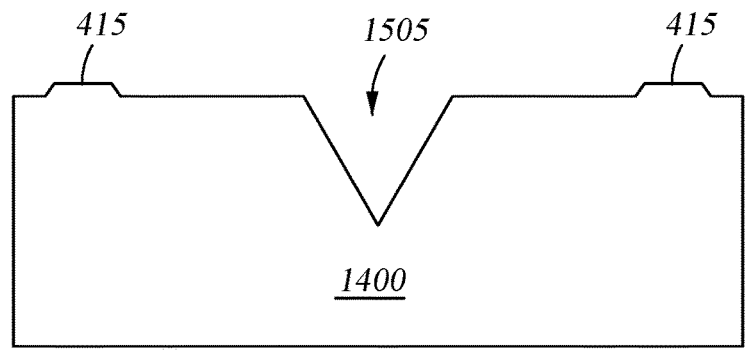
Figure 15C:
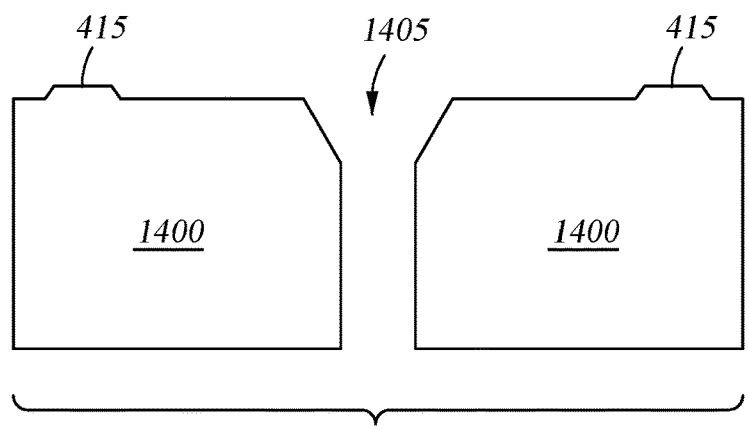

FIGS. 15A-15C illustrate forming alignment protrusions and an optical window in the FAU 150 in FIGS. 14A and 14B, according to one embodiment disclosed herein. In one embodiment, the process illustrated in FIGS. 15A-15C is performed before the optical fibers and lid are attached to the silicon substrate 1400. Further, the cross section of the silicon substrate 1400 in FIGS. 15A-15C corresponds to the dotted line B-B illustrated in FIG. 15A.

FIG. 15A illustrates using an orientation dependent etch to form the alignment protrusions 415. For example, a KOH etch can be used to tightly control the angle of the slope of the sides of the frustums formed by the protrusions 415. As mentioned above, these sides can form self-correcting alignment features 820 as shown in FIGS. 8-12.

FIG. 15B illustrates using an orientation dependent etch to form a V-groove 1505 in the silicon substrate 1400. In one embodiment, the dimensions of the V-groove 1505 may be set to match the desired dimensions of an optical window. Although not required, the V-groove 1505 (which serves as a portion of the optical window) may be formed in parallel with forming a plurality of V-grooves (not shown) in which are disposed the optical fibers. Forming the V-groove 1505 in the same etching step as forming the V-grooves for the optical fibers may reduce the time used for forming the FAU.

FIG. 15C illustrates performing a second etching step to form the optical window 1405 which extends through the silicon substrate 1400. Rather than using an orientation dependent etch, the remaining portion of the optical window 1405 can be formed using sandblasting or DRIE. Moreover, instead of using two etching steps, in another embodiment, the optical window 1405 is formed using a single etching step—e.g., using sandblasting or DRIE.

Because the optical window 1405 extends through the silicon layer 1400, the window 1405 enables radiation emitted from the bottom of the silicon layer 1400 to reach the top of the silicon layer 1400. In this manner, the window 1405 permits UV radiation to cure epoxy disposed on the photonic chip that couples or mates with the protrusions 415.

Figure 16A:
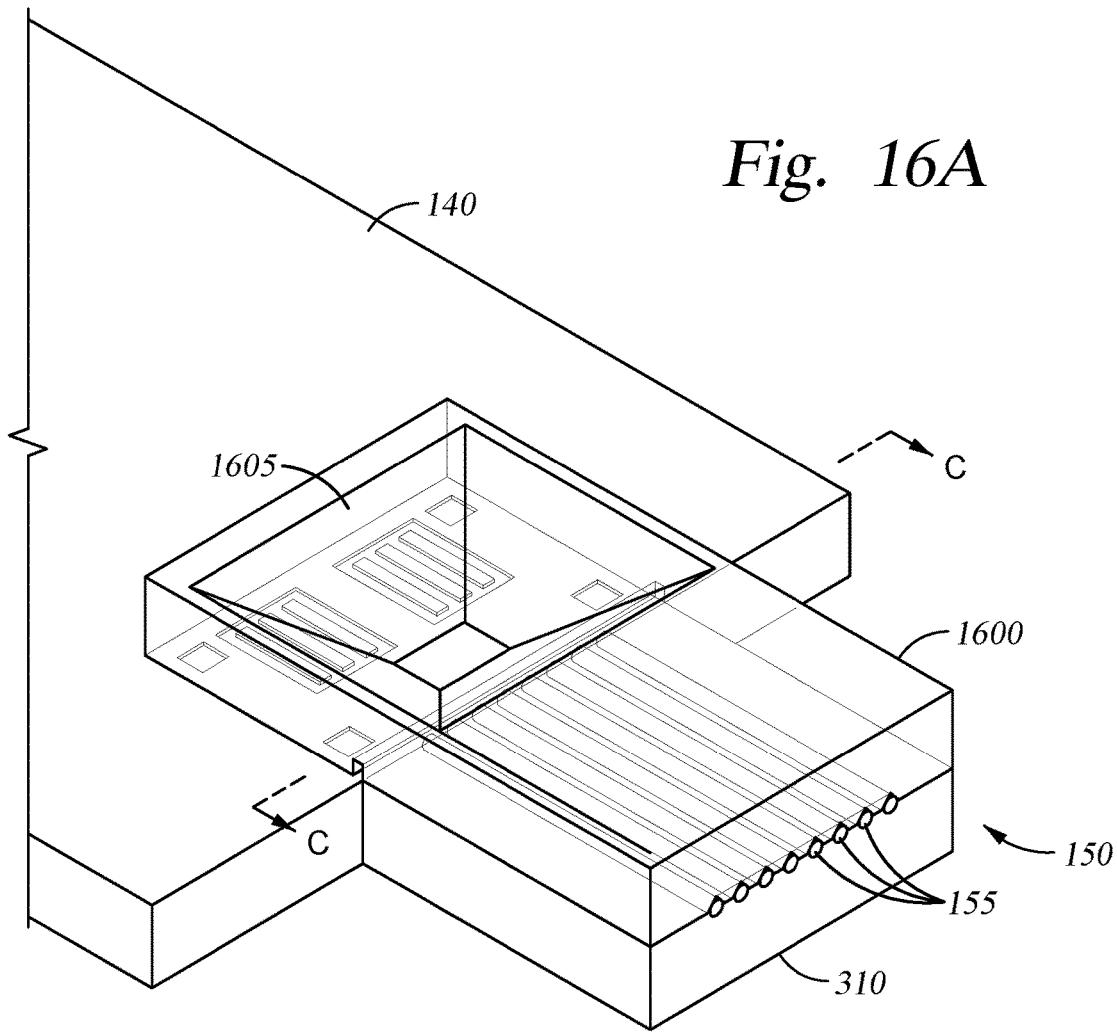
FIGS. 16A and 16B illustrate a fiber array unit with a silicon substrate, according to one embodiment disclosed herein.
Figure 16B:
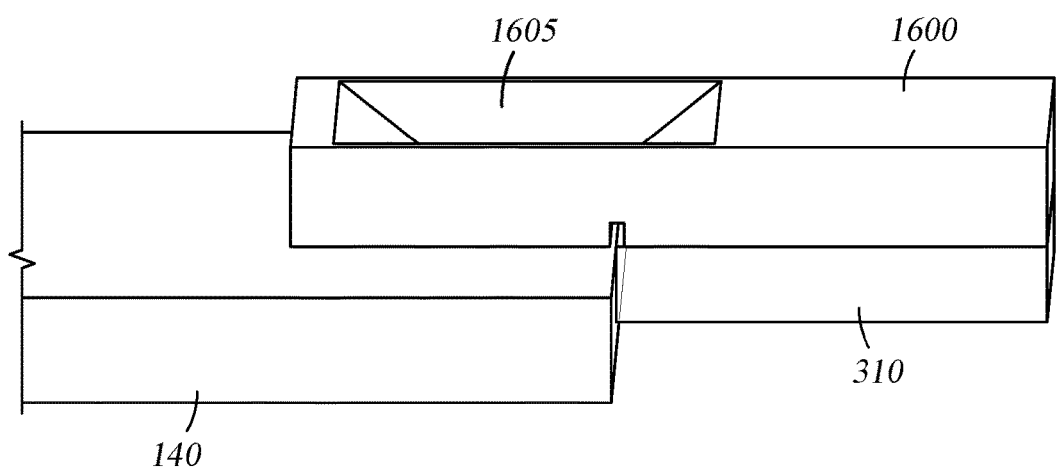

FIGS. 16A and 16B illustrate an FAU 150 with a silicon substrate, according to one embodiment disclosed herein. FIG. 16A illustrate the FAU 150 coupled to the photonic chip 140. Although not transparent, the silicon substrate 1600 is shown as being transmissive so that the details of the components beneath the silicon substrate 1600 can be seen such as the optical fibers 155, epoxy wells, and alignment receivers. In one embodiment, the silicon substrate 1600 a thickness greater than 500 microns. In another embodiment, the silicon substrate 1600 has thickness greater than 1000 microns.

The silicon substrate 1600 includes an optical window 1605 formed using an orientation dependent etchant such as KOH. FIG. 16B illustrates a side view of the optical system illustrated in FIG. 16A. In FIG. 16B, the silicon substrate 1600 is illustrated as a solid material to better illustrate the shape of the optical window 1605. In this example, the optical window 1605 forms a reverse frustum where the sides of the optical windows slope towards each other while extending through the silicon substrate 1600.

In one embodiment, the funnel created by the reverse frustum shape of the optical window 1605 is used to dispose epoxy onto the photonic chip 140. For example, after placing the FAU 150 onto the photonic chip using the alignment features, epoxy may be dispensed into the optical window 1605. The large base of the funnel shape of the window 1605 means the tolerance on the placement of the epoxy can much greater than using optical windows in some of the previous embodiments. The funnel shape (with the aid of gravity) can channel the epoxy so that the epoxy exits the optical window onto the desired location of the photonic chip—e.g., between the optical interface and the termination ends of the optical fibers or the epoxy wells. Additionally, the funnel window is etched through the entire silicon FAU, so that UV light can be used to cure or tack the epoxy after dispense.

Figure 17A:
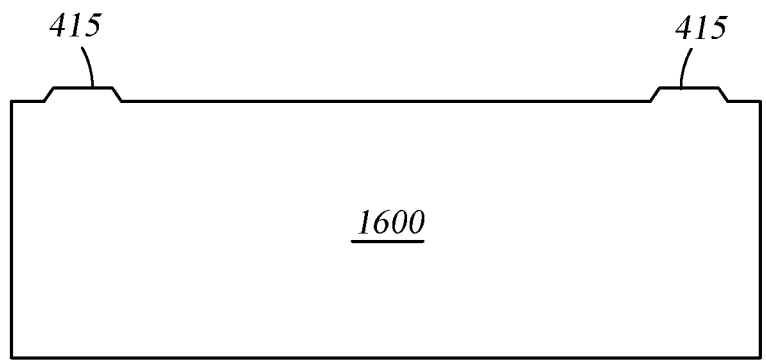
FIGS. 17A and 17B illustrate forming alignment protrusions and an optical window in the fiber array unit in FIGS. 16A and 16B, according to one embodiment disclosed herein.
Figure 17B:
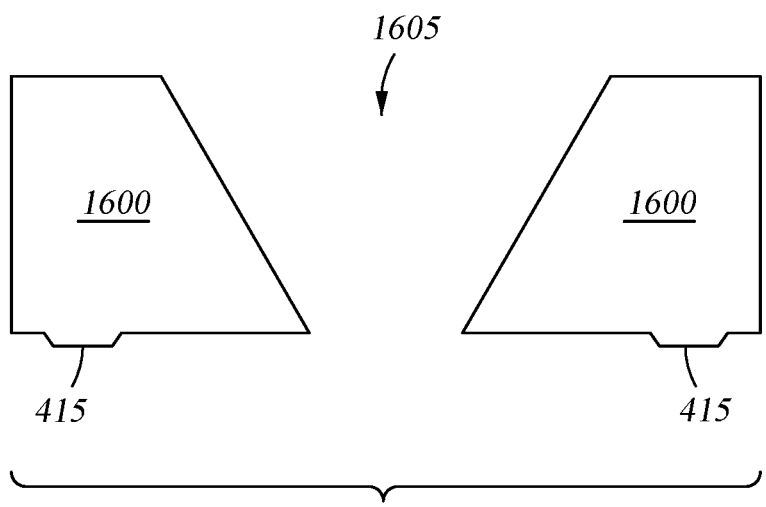

FIGS. 17A and 17B illustrate forming alignment protrusions 415 and an optical window 1605 in the FAU 150 in FIGS. 16A and 16B, according to one embodiment disclosed herein. In one embodiment, the process illustrated in FIGS. 17A and 17B is performed before the optical fibers and lid are attached to the silicon substrate 1600. Further, the cross section of the silicon substrate 1600 in FIGS. 17A and 17B corresponds to the dotted line C-C illustrated in FIG. 16A.

FIG. 17A illustrates using an orientation dependent etch to form the alignment protrusions 415. For example, a KOH etch can be used to tightly control the angle of the slope of the sides of the frustums formed by the protrusions 415. As mentioned above, these sides can form self-correcting alignment features 820 as shown in FIGS. 8-12.

FIG. 17B illustrates using an orientation dependent etch to form the optical window 1605 in the silicon substrate 1600. Specifically, the substrate 1600 has been flipped relative to its orientation in FIG. 17A. In one embodiment, the unmasked portion of the top of the silicon substrate 1600 is selected to result in the desired dimension of the optical window at the bottom of the silicon substrate 1600. That is, given the etch angle of the orientation dependent etch and the thickness of the silicon substrate 1600, the size of the unmasked portion at the top of the silicon substrate 1600 can be determined that results in a desired size of the window 1605 at the bottom of the silicon substrate 1600.

In one embodiment, the window 1605 is formed in parallel with forming a plurality of V-grooves (not shown) in the silicon substrate 1600 for holding and aligning the optical fibers. Forming the window 1605 in the same etching step as forming the V-grooves for the optical fibers may reduce the time used for forming the FAU.

Figure 18:
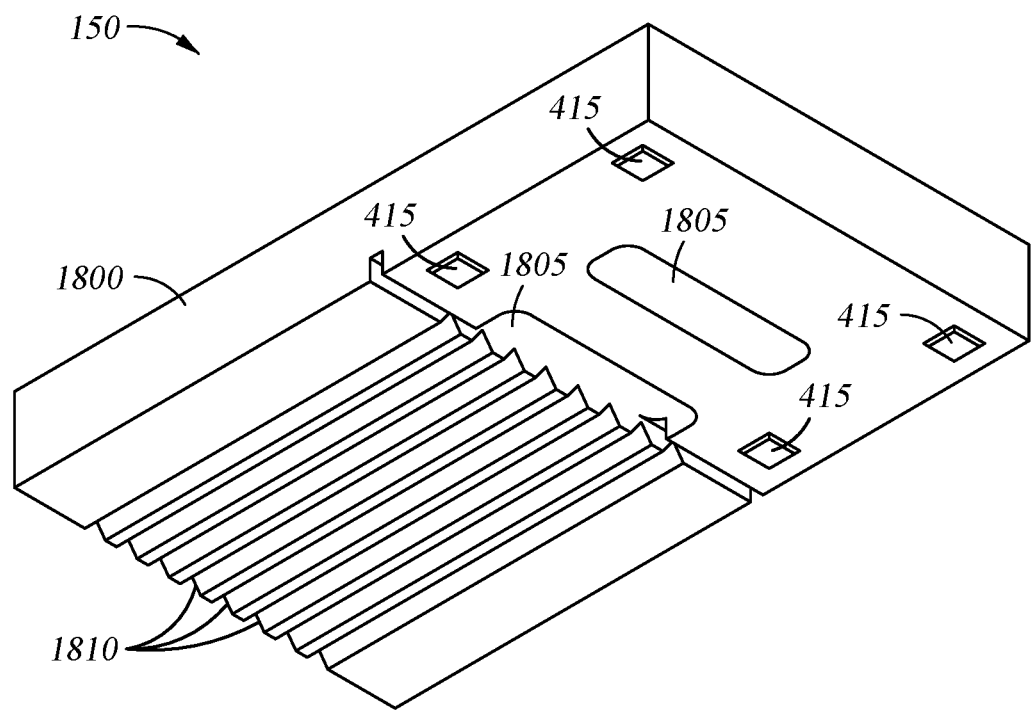
FIG. 18 illustrates a molded part for a fiber array unit, according to one embodiment disclosed herein.

FIG. 18 illustrates a molded part 1800 for a FAU 150, according to one embodiment disclosed herein. The molded part 1800 may include a single material such as a polymer or plastic which is shaped using a molding process to include the alignment protrusions 415, optical windows 1805 and V-grooves 1810 for aligning and holding the optical fibers. That is, instead of using a semiconductor substrate (e.g., a silicon substrate or a combination of a silicon layer and a transparent layer), the FAU 150 includes the molded part 1800. The molding process can have sufficient tolerance such that the alignment shown in FIGS. 8-12 can be achieved by mating or interlock the alignment protrusions 415 to alignment receivers in the photonic chip.

The optical windows 1805 can be arranged in the molded part 1800 such that when the molded part 1800 is aligned with the photonic chip, at least one of the windows 1805 is disposed over the optical interface in the photonic chip that aligns to the termination ends of the optical fibers disposed in the V-grooves 1810. That way, radiation can pass through the molded part to reach index matching or non-index matching epoxy disposed between the optical interface and the optical fibers as discussed above. One or more other windows 1805 in the molded part 1800 can be disposed over one or more epoxy wells in the photonic chip.

In view of the foregoing, the scope of the present disclosure is determined by the claims that follow.

We claim:
1. An optical system, comprising:
a photonic chip, comprising:
a waveguide,
an optical interface optically coupled to the waveguide, and
an alignment receiver; and
a fiber array unit (FAU) coupled with the photonic chip using cured adhesive, the FAU comprising:
a substrate comprising:
an optical window formed through a non-transparent material,
a plurality of grooves, and
an alignment protrusion interlocked with the alignment receiver,
an optical fiber disposed in the groove and aligned to the optical interface in the photonic chip based on the interlocked relationship between the alignment protrusion and the alignment receiver, and
a lid, wherein the optical fiber is disposed between the lid and the substrate,
wherein the optical window is disposed over the cured adhesive, has a width that spans a majority of the plurality of grooves, and is configured to hold excess adhesive.

2. The optical system of claim 1, wherein the optical fiber is optically connected to the optical interface with an adhesive disposed between the optical fiber and the optical interface.

3. The optical system of claim 2, wherein the cured adhesive comprises the adhesive disposed between the optical fiber and the optical interface, wherein the optical window is disposed over the cured adhesive such that radiation emitted at a top surface of the substrate passes through the optical window to exit a bottom surface of the substrate.

4. The optical system of claim 1, wherein the non-transparent material blocks radiation for curing the cured adhesive, wherein the optical window forms an aperture in the non-transparent material thereby exposing the cured adhesive.

5. The optical system of claim 1, wherein the photonic chip comprises an adhesive well in a facing relationship with a surface of the substrate comprising the alignment protrusion, wherein the substrate comprises a second optical window disposed over the adhesive well, wherein the alignment protrusion is formed using the non-transparent material.

6. The optical system of claim 1, wherein the substrate comprises a transparent layer of the non-transparent material and a non-transparent layer, wherein the optical window extends through the non-transparent layer to provide a guide for dispensing uncured adhesive.

7. The optical system of claim 1, wherein the substrate consists of a semiconductor material such that the optical window, the alignment protrusion, and the groove are formed from the semiconductor material, wherein the optical window extends through a first surface and an opposing second surface of the semiconductor material.

8. The optical system of claim 1, wherein the substrate consists of a molded material such that the optical window, the alignment protrusion, and the groove are formed from the molded material, wherein the optical window extends through a first surface and an opposing second surface of the molded material.

9. The optical system of claim 1, wherein the alignment protrusion forms a frustum, wherein the alignment protrusion is formed using the non-transparent material.

10. The optical system of claim 9, wherein at least two sloped sides of the frustum form self-correcting alignment features, wherein at least one of the self-correcting alignment features contacts a side of the alignment receiver.

11. The optical system of claim 10, wherein at least two of the self-correcting alignment features contact respective sides of the alignment receiver.

12. The optical system of claim 11, wherein a bottom surface of the frustum is separated by a gap from a bottom surface of the alignment receiver.

13. The optical system of claim 9, wherein a bottom surface of the frustum contacts a bottom surface of the alignment receiver.

14. The optical system of claim 9, wherein a flat bottom surface of the substrate at a base of the frustum contacts a top surface of the photonic chip, and wherein a bottom surface of the frustum is separated by a gap from a bottom surface of the alignment receiver.

* * * * *